United States Patent
Yang

(10) Patent No.: US 9,848,732 B2
(45) Date of Patent: Dec. 26, 2017

(54) PORTABLE UNIFORM-TEMPERATURE GAS OVEN

(71) Applicant: Jiangmen Cadero Hardware Products Mfg. Co., Ltd., Jiangmen (CN)

(72) Inventor: Jianying Yang, Jiangmen (CN)

(73) Assignee: JIANGMEN CADERO HARDWARE PRODUCTS MFG. CO., LTD., Jiangmen (CN)

( * ) Notice: Subject to any disclaimer, the term of this patent is extended or adjusted under 35 U.S.C. 154(b) by 507 days.

(21) Appl. No.: 14/527,383

(22) Filed: Oct. 29, 2014

(65) Prior Publication Data
US 2015/0265100 A1    Sep. 24, 2015

(30) Foreign Application Priority Data

Mar. 20, 2014  (CN) .......................... 2014 1 0105540

(51) Int. Cl.
  A47J 37/07     (2006.01)
  A47J 37/06     (2006.01)

(52) U.S. Cl.
  CPC ....... *A47J 37/0763* (2013.01); *A47J 37/0647* (2013.01); *A47J 2037/0777* (2013.01)

(58) Field of Classification Search
  USPC ......................................... 126/25 R, 38, 9 B
  See application file for complete search history.

(56) References Cited

U.S. PATENT DOCUMENTS

| | | | | |
|---|---|---|---|---|
| 2,866,883 | A * | 12/1958 | Borden | A47J 37/0709 126/25 B |
| 3,667,449 | A * | 6/1972 | Persinger | A47J 37/0713 126/25 R |
| 3,959,620 | A * | 5/1976 | Stephen, Jr. | A47J 37/0709 126/25 R |
| 4,899,724 | A * | 2/1990 | Kuechler | A47J 37/0682 126/39 BA |
| 5,211,105 | A * | 5/1993 | Liu | A47J 37/01 126/348 |
| 5,553,601 | A * | 9/1996 | Parker | A47J 37/0763 126/38 |
| 7,762,249 | B2 * | 7/2010 | Johnson | A47J 37/0704 126/39 B |
| 2002/0020405 | A1 * | 2/2002 | Coleman | A47J 37/0682 126/41 R |
| 2007/0119442 | A1 * | 5/2007 | Ho | A47J 37/0611 126/9 R |
| 2009/0084376 | A1 * | 4/2009 | Johnson | A47J 37/0704 126/9 B |
| 2009/0250048 | A1 * | 10/2009 | Educate | A47J 37/0713 126/25 R |
| 2012/0266857 | A1 * | 10/2012 | Lin | A47J 37/0786 126/25 R |
| 2014/0182581 | A1 * | 7/2014 | Rees | A47J 37/0763 126/9 B |

(Continued)

*Primary Examiner* — Avinash Savani
(74) *Attorney, Agent, or Firm* — CBM Patent Consulting, LLC

(57) ABSTRACT

A portable uniform-temperature gas oven, comprising an upper cover, an oven body, a burner, a flame dispersion plate, a grilling net, a supporting seat and a bracket. The oven has the advantages of simple structure, scientific application, uniform-temperature grilling surface, and environment protection, lightweight, folding and carrying in convenience.

9 Claims, 5 Drawing Sheets

(56) References Cited

U.S. PATENT DOCUMENTS

2014/0251302 A1\* 9/2014 Ahmed ............... A47J 37/0713
 126/25 R
2015/0013667 A1\* 1/2015 Ho ...................... A47J 37/0763
 126/9 B \* cited by examiner

PORTABLE UNIFORM-TEMPERATURE GAS OVEN

This application claims priority to Chinese Patent Application Ser. No. CN201410105540.6 filed 20 Mar. 2014.

FIELD OF THE INVENTION

The present invention relates to the field of household devices for gas barbecuing, and more particularly to a portable uniform-temperature gas burner.

DESCRIPTION OF THE RELATED ART

Currently, there are various gas ovens with different structures and functions. However, most of the existing ovens at least have one of more of the following disadvantages:
1. the barbecuing surface of a gas oven has non-uniform temperature, this will cause that the food on the area right over the burner is baked and the food on the other areas is half-baked.
2. straight-pipe burners are used in a conventional oven, and thus the temperature is not non-uniform, this will lead to the energy waste because the gas is not utilized efficiently.
3. a conventional gas oven is bigger and heavier and thus can not be carried conveniently; furthermore, many gas ovens in the market do not have the function of ignition by themselves, and the burners can not be detached and thus can not be cleaned conveniently.

SUMMARY OF THE INVENTION

An object of the invention is to provide a portable uniform-temperature gas oven to overcome the above problems, the gas oven has the advantages of simple and folding structure, uniform-temperature grilling surface, environment protection, light weight and carrying in convenience.

For the above purpose, the invention utilizes the following technical solution:
 a portable uniform-temperature gas oven, comprising an upper cover, an oven body, a burner, a flame dispersion plate, a grilling net, a supporting seat having a limiting arc surface and a bracket, wherein:
 a rear portion of the upper over is connected to a rear portion of the oven body by a hinge;
 the supporting seat is connected to the bottom of the oven body near the two sides of the oven body, and the bracket is clamped with the supporting seat; and
 the burner is disposed in the oven body, and a left side of the burner is fixedly connected at a left end of the oven body by a burner front supporting seat, a right side of the burner is fixedly connected at a right end of the oven body by a burner rear supporting plate, and the flame dispersion plate is clamped on the upper side of the burner, and the grilling net is fixed on the upper side of the flame dispersion plate.

Preferably, the burner comprises an air inlet pipe, which extends through the side wall of the oven body and is communicated with gas;
 four side pipes, which forms a closed structure by connecting with each other end to end, wherein the air inlet pipe is communicated with the left side pipe at the outer side of the left side pipe, a plurality of connecting holes respectively and correspondingly are opened on the inner sides of the front side pipe and the rear side pipe, and the fixing plate is connected on the outer sides of the front side pipe and rear side pipe, and the flame dispersion plate is clamped in the fixing plate; and
 a plurality of burning pipes arranged side by side, and two ends of each burning pipe respectively are sleeved within the connecting holes on the front and rear side pipes, and multiple burning holes respectively and densely are opened on the burning pipes.

Preferably, a plurality of caps are arranged on the flame dispersion plate side by side, and the plurality of caps respectively is provided above the burning holes on the burner, and a gap is provided between adjacent caps.

More preferably, a longer and shorter hinges are respectively provide at the rear ends of the upper cover at the left and right sides, two ends of each longer hinge respectively are fixed on the upper cover and the oven body near the inner side, and two ends of each shorter hinge respectively are fixed on the upper cover and the oven body near the edge.

Still more other preferably, the bottom of the oven body substantially is configured as an inverted cone structure, and an oil leaking hole is opened on the middle of the cone structure of the oven body, and an oil box is disposed at the bottom of the oven body corresponding to the oil leaking hole.

Preferably, two locking rings respectively are disposed at two front ends of the upper cover at left and right sides, and two locking hasps respectively are provided at the left and right sides of the oven body corresponding to the two locking rings, when the upper cover is in a closed state, the locking rings respectively are buckled in the locking hasps such that the upper cover will not be opened at the time of being lifted.

More preferably, a limiting groove is provided in the supporting seat, and the bracket is clamped in the limiting groove.

Preferably, a rectangular handle is fixed on the front side of the oven body.

More preferably, an igniter is fixed at the left end of the oven body by an igniting box at the front side of the oven body.

Preferably, the flame dispersion plate is provided with four fixing foots at four corners thereof, and the grilling net is provided with four supporting foots at four corners thereof, and the four supporting foots respectively are inserted into the four fixing foots of the flame dispersion plate.

By adopting the above technical solution, as compared with the prior art the invention has the advantages of simple and folding structure, uniform-temperature grilling surface, environment protection, light weight and carrying in convenience.

The gas oven of the invention has the ignition function by itself, and the inner chamber of the oven is made of stainless and formed integratedly by drawing. The burner of the gas oven of the invention is detachable and convenient for cleaning. Furthermore by utilizing the gas oven of the invention, more than 20% of energy can be saved comparing with a conventional burner in the same condition.

wherein:

1. an upper cover; 101. a locking ring; 102. a hinge; 103. a locking hasp; 2. an oven body; 3. a burner; 301. an air inlet pipe; 302. a side pipe; 303. a connecting hole; 304. a burning pipe; 305. a burning hole; 306. a fixing plate; 4. a flame dispersion plate; 401. a cap; 5. a grilling net; 6. a burner front supporting seat; 7. a burner rear supporting seat; 8. an igniter; 10. an igniting box; 10. an oil box; 11. a handle; 12. a supporting seat; 1201. a limiting groove; 13. a bracket.

DETAILED DESCRIPTION OF THE INVENTION

Preferred embodiments of the present invention will now be described in more detail hereinafter with reference to the drawings.

Figure 1:
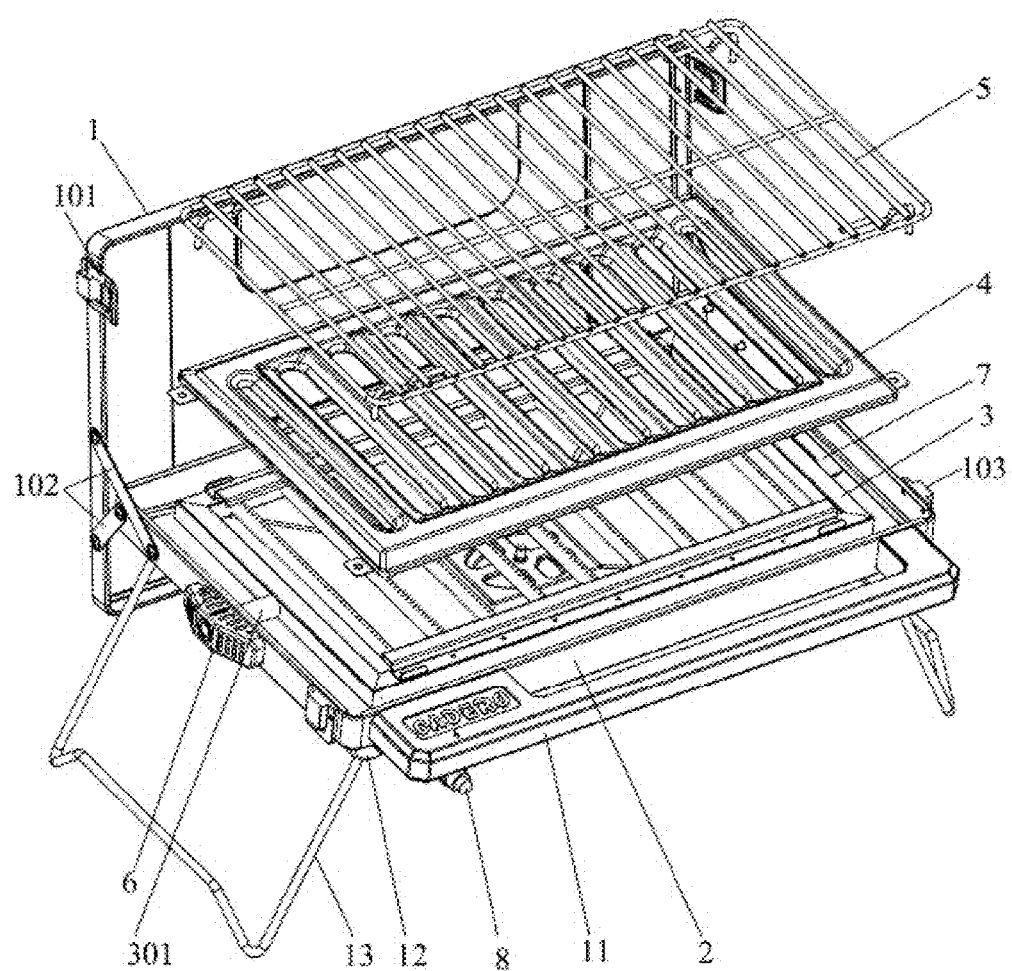
FIG. 1 is a perspective drawing of a portable uniform-temperature gas oven according to the invention.
Figure 2:
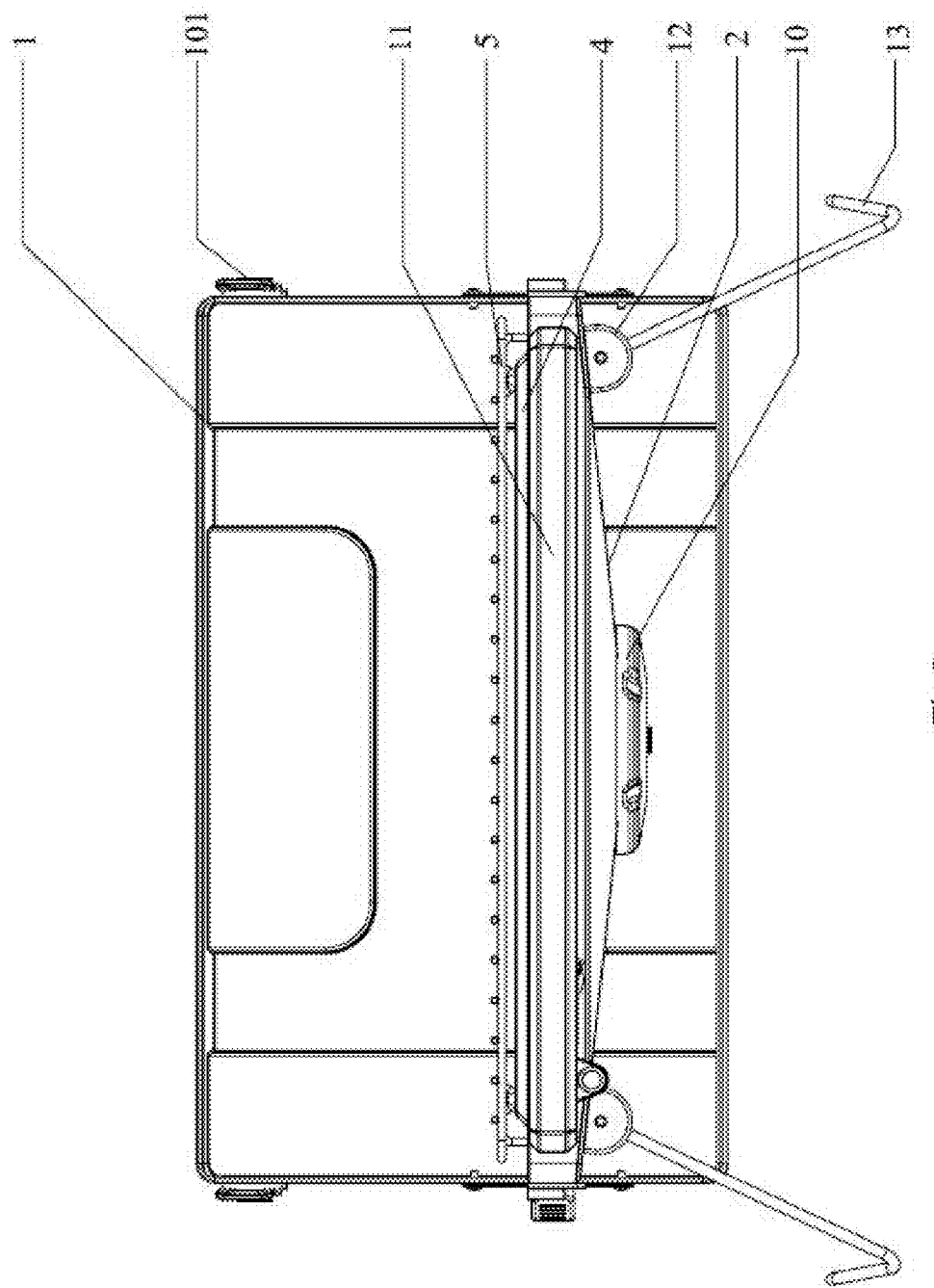
FIG. 2 is a front view of the portable uniform-temperature gas oven according to the invention.
Figure 3:
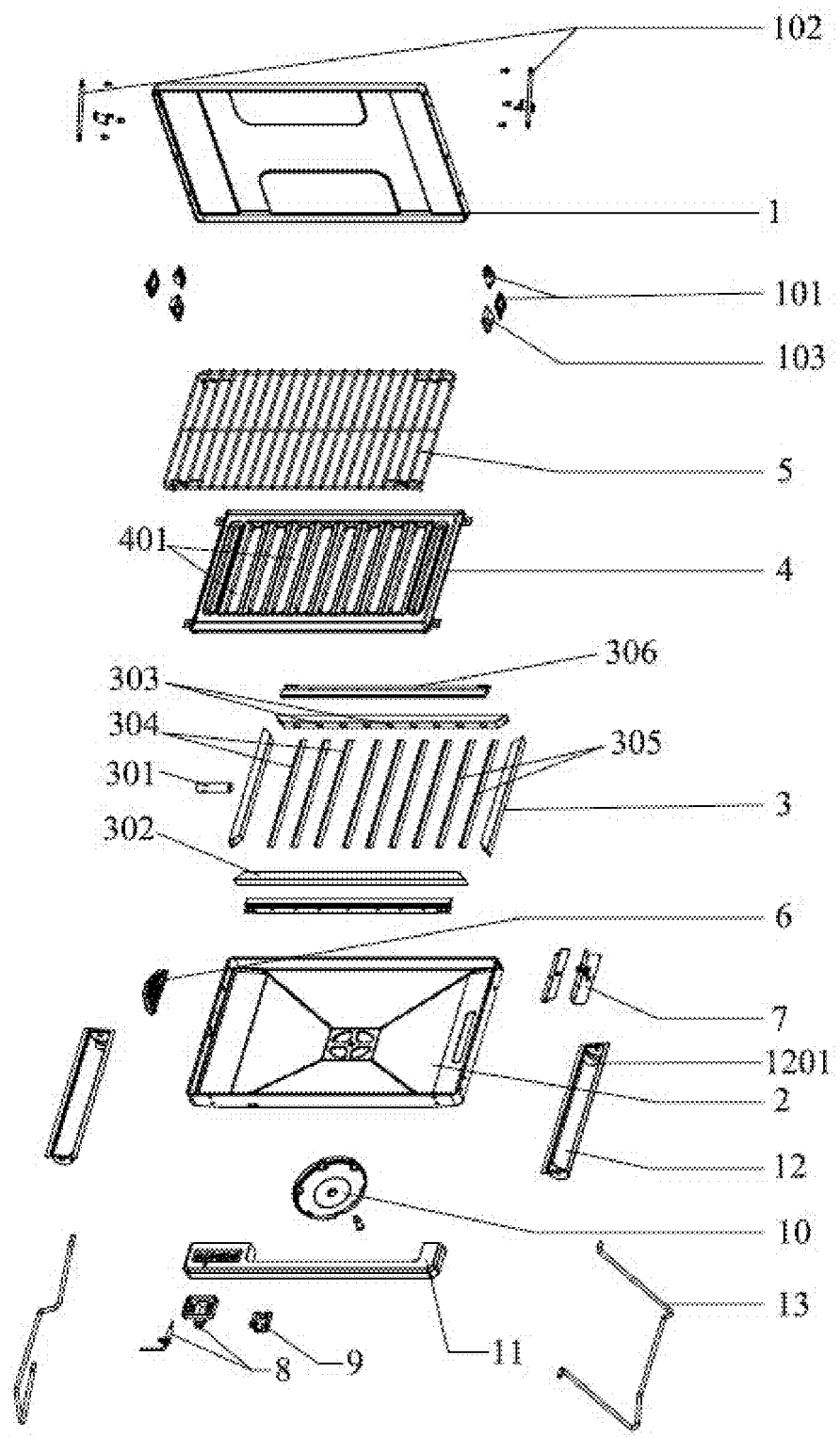
FIG. 3 is an exploded view of the portable uniform-temperature gas oven according to the invention.
Figure 4:
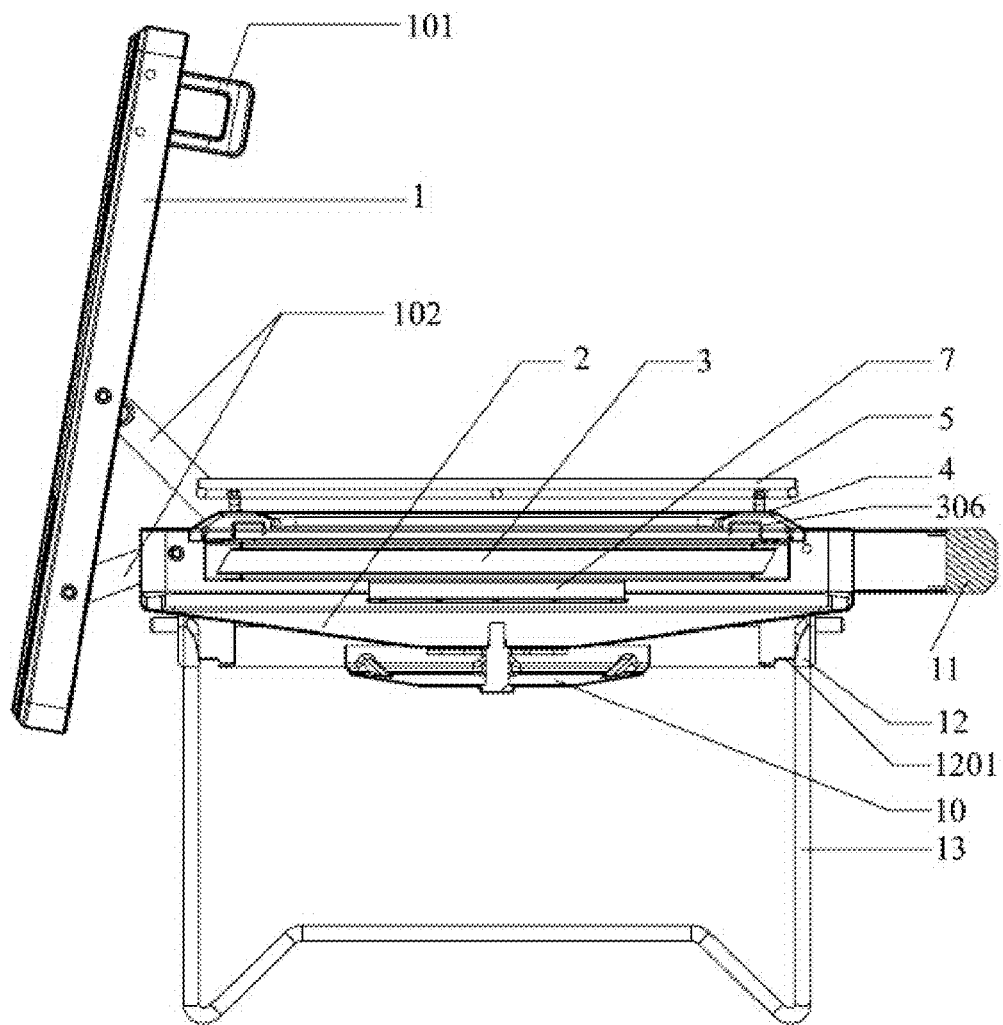
FIG. 4 is a longitudinal sectional view of the portable uniform-temperature gas oven according to the invention.
Figure 5:
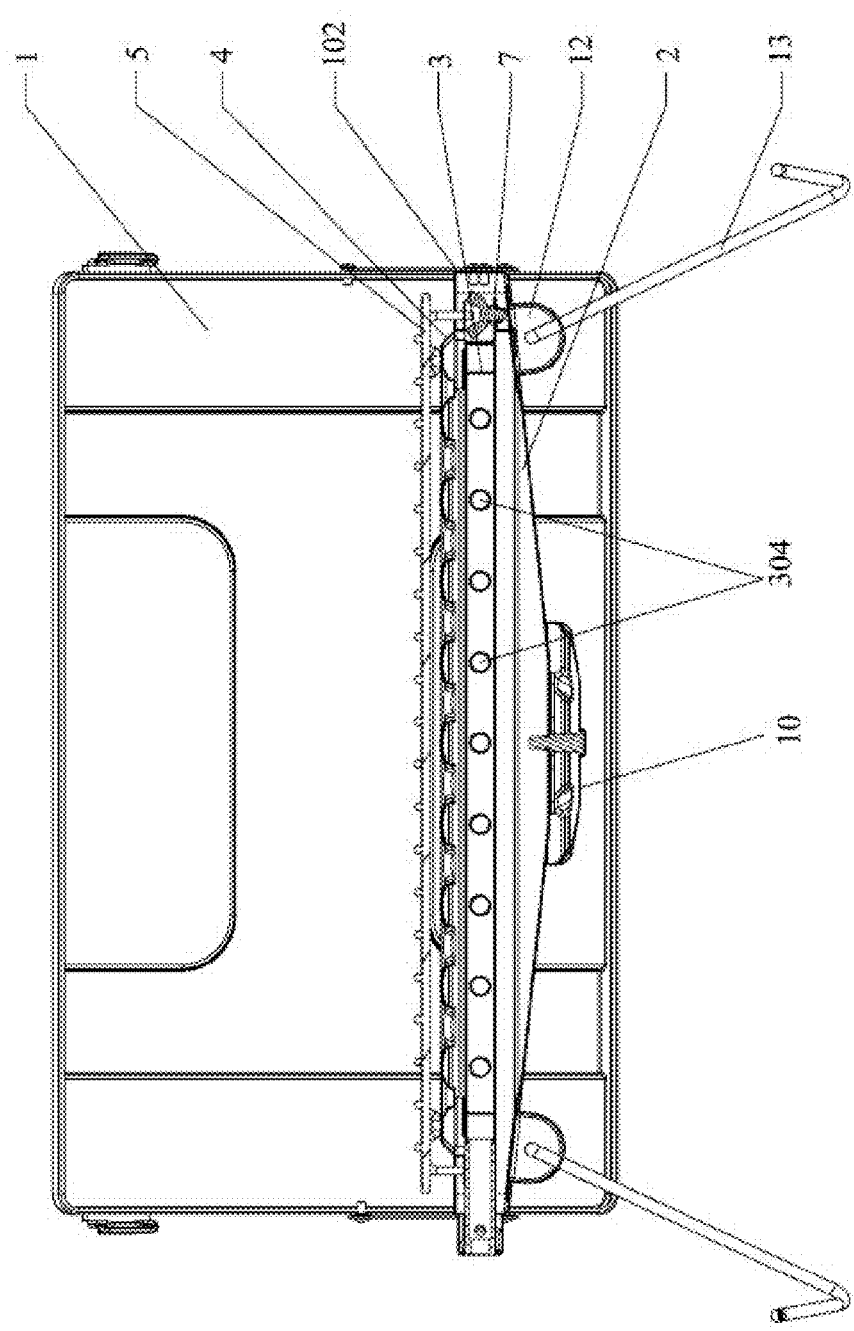
FIG. 5 is a lateral sectional view of the portable uniform-temperature gas oven according to the invention.

As shown in FIGS. 1-5, the portable uniform-temperature gas oven comprises an upper cover 1, an oven body 2, a burner 3, a flame dispersion plate 4, a grilling net 5, a supporting seat 12 and a bracket 13. The rear portion of the upper cover 1 is connected to the rear portion of the oven body 2 by two hinges 102, and the upper cover 1 can be overturned by means of the hinges 102. Two supporting seats 12 respectively are connected to the bottom of the oven body near the two sides of the oven body by bolts, and each supporting seat which has a limiting arc surface is clamped with a bracket 13. The oven body 2 is supported by the brackets 13 and supporting seats 12 and the oven body 2 is formed intergratedly by drawing. A burner 3 is disposed in the oven body 2, the left side of the burner 3 is fixed at the left end of the oven body 2 by a burner front supporting seat 6, and the right side of the burner 3 is fixed at the right end of the oven body 2 by a burner rear supporting plate 7, this configuration makes the gas oven easy to clean. A flame dispersion plate 4 is clamped on the above side of the burner 3, and the flame dispersion plate 4 is integratedly punch-formed, and has the advantages of high strength, long lifetime and not easy to deformation four fixing foots respectively are provided at the four corners of the flame dispersion plate 4, and a grilling net 5 which is a stainless net is fixed by the four fixing foots. The grilling net 5 is lightweight and durable, and has reasonable grid spacing such that the food is not easy to fall off when grilling. Four supporting foots respectively are provided at the four corners of the grilling net 5, and the supporting foots respectively are inserted into the four fixing foots of the flame dispersion plate 4, and this will guarantee that the grilling net 5 will not be moved during using. Thus, the assembly of the oven is simple and the security can be guaranteed.

The burner 3 comprises an air inlet pipe 301, four side pipes 302, a plurality of connecting holes 302, a plurality of burning pipes 304, multiple burning holes 305 and a fixing plate 306. The four side pipes 302 forms a closed structure by connecting with each other end to end, the air inlet pipe 301 is communicated with the left side pipe 302 at the outer side thereof, and the air inlet pipe 301 extends through the side wall of the oven body 2 and is communicated with gas. The plurality of connecting holes 302 respectively and correspondingly are opened on the inner sides of the front side pipe 302 and the rear side pipe 302, the plurality of burning pipes 304 are arranged side by side, and two ends of each burning pipe respectively are sleeved within the connecting holes 302 on the front and rear side pipes 302, and the multiple burning holes 305 respectively and densely are opened on the burning pipes 304. By adopting the above structure, the temperate of the grilling surface can be more uniform, and in the same condition, energy can be saved more than 20% comparing with a conventional burner. Furthermore, all parts of the burner 3 are incorporated by welding, and burner is not easy to deform, detachable and convenient to clean. the fixing plate 306 is connected on the outer sides of the front side pipe and rear side pipe 302 by welding, and the flame dispersion plate 4 is clamped in the fixing plate 306 such that it can be firmly clamped on the burner 3, and this will guarantee that the flame dispersion plate 4 will not be moved overmuch during carrying and using.

A plurality of caps 401 are arranged on the flame dispersion plate 4 side by side, and the plurality of caps 401 respectively are provided above the burning holes 305 on the burner 3, and a gap is provided between adjacent caps 401, the oil resulting from grilling will drip into the bottom of the oven body 2 through the gap between the caps 401 of the flame dispersion plate 4, and thus the flame dispersion plate 4 can protect the burner 3 and prevent the burning holes 305 from blocking.

The upper cover 1 is formed integratedly by drawing and has high strength. Two hinges 102 are disposed at the rear end of the upper cover 1 at each of the left and right sides. And at the same side, the two hinges comprise a longer and shorter hinges. Two ends of each longer hinge respectively are fixed on the upper cover and the oven body near the inner side by bolts, and two ends of each shorter hinge respectively are fixed on the upper cover and the oven body near the edge by bolts. The two hinges 102 are ganged hinges. The upper cover 1 can be opened easily under the linkage effect of the two hinges 102, and the upper cover 1 can be erected behind the oven body 2 after being opened, and can keep the wind out during grilling.

Two locking rings 101 respectively are disposed at two front ends of the upper cover 1 at left and right sides, and two locking hasps 103 respectively are provided at left and right sides of the oven body corresponding to the two locking rings. When the upper cover is in a closed state, the locking rings respectively are buckled in the locking hasps such that the upper cover will not be opened at the time of being lifted.

A limiting groove 1201 is provided in each supporting seat 12, and the bracket 13 is fixed by the limiting groove 1201 such that the oven body 2 is supported by the bracket 13. When not in use, the bracket 13 is laterally and inwards pressed such that it departs from the limiting groove 1201, and after being turned, the bracket 13 can be folded fully to near the bottom of the oven body, in this case, the oven is easy to package and carry. When in use, the bracket 13 can be opened as splayed so that it can play a role of supporting the whole oven, thus, the oven of the invention can save some space and be easy to carry.

The bottom of the oven body 2 substantially is configured as an inverted cone structure, such that the oil contamination falling into the oven body 2 can flow conveniently. Four oil leaking holes are symmetrically opened on the middle of the cone structure of the oven body 2, and oil boxes 10 are disposed at the bottom of the oven body corresponding to the oil leaking holes. By means of the above structure, the oil resulting from grilling converges at the bottom of the oven body and flows into the oil boxes 10 through the oil leaking holes. The oil boxes 10 are detachable, and have the advantages of easy cleaning, security and sanitation.

A rectangular handle 11 is fixed on the front side of the oven body 2 by bolts, and the handle 11 has elegant appearance and firm installation, and it is convenient to lift the oven during carrying.

An igniter 8 is fixed at the left end of the oven body by an igniting box 9 at the front side of the oven body 2, and the burner 3 is ignited by the igniter 8 which is positioned more user-friendly and can be operated more conveniently.

It is to be noted, however, that above contents are described for illustrating the invention in more detail in connection with the preferred embodiments, so that a person skilled in the art can easily understand and implement the invention, and this does not means that the invention is limited to the illustration. Furthermore, within the technical concept of the invention, mangy simple inferences and substitutions can be made without creative works. Consequently, according to the disclosure of the invention, any simple improvements made by a person skilled in the art will fall into the protection scope of the invention.

What is claimed is:

1. A portable uniform-temperature gas oven, comprising an upper cover, an oven body, a burner, a flame dispersion plate, a grilling net, a waste oil collector, a supporting seat having a limiting arc surface and a bracket;
    a rear portion of the upper over is connected to a rear portion of the oven body by a hinge;
    the supporting seat being connected to the bottom of the oven body near the two sides of the oven body, and the bracket being clamped with the supporting seat; and
    the burner being disposed in the oven body, and a left side of the burner being fixedly connected at a left end of the oven body by a burner front supporting seat, a right side of the burner being fixedly connected at a right end of the oven body by a burner rear supporting plate, and the flame dispersion plate being attached on the upper side of the burner, and the grilling net being fixed on the upper side of the flame dispersion plate;
    the waste oil collector being installed under the bottom of the oven cavity;
    wherein the burner comprising a plurality of burning pipes, four side pipes and a gas inlet pipe which extends through the side wall of the oven body and is communicated with gas;
    the four side pipes, which forms a closed structure by connecting with each other end to end, the gas inlet pipe is communicated with the left side pipe at the outer side of the left side pipe, a plurality of connecting holes are correspondingly provided on the inner sides of the front side pipe and the rear side pipe, respectively, and a fixing plate is connected on the outer sides of the front side pipe and rear side pipe, and the flame dispersion plate being attached in the fixing plate; and the plurality of burning pipes arranged side by side, and two ends of each burning pipe are sleeved within the connecting holes on the front and rear side pipes, respectively, and multiple burning holes are densely provided on the burning pipes, respectively; the multiple burning holes allow gas to mix with air for burning.

2. The portable uniform-temperature gas oven as claimed in claim 1, wherein a plurality of caps are arranged on the flame dispersion plate side by side, and the plurality of caps are provided above the burning holes on the burner, respectively, and a gap is provided between adjacent caps.

3. The portable uniform-temperature gas oven as claimed in claim 1, wherein a longer and shorter hinges are provided at the rear ends of the upper cover at the left and right sides, respectively, two ends of the longer hinge are fixed on the upper cover and the oven body near the inner side, respectively, and two ends of the shorter hinge are fixed on the upper cover and the oven body near the edge, respectively.

4. The portable uniform-temperature gas oven as claimed in claim 1, wherein the bottom of the oven body is configured as the waste oil collector consists of an inverted cone structure, and an oil leaking hole is provided on the middle of the cone structure of the oven body, and an oil box is installed at the bottom of the oven body corresponding to the oil leaking hole.

5. The portable uniform-temperature gas oven as claimed in claim 3, wherein two locking rings are disposed at two front ends of the upper cover at the left and right sides, respectively, and two locking hasps are provided at the left and right sides of the oven body corresponding to the two locking rings, respectively, when the upper cover is in a closed state, the locking rings respectively are buckled in the locking hasps, respectively.

6. The portable uniform-temperature gas oven as claimed in claim 5, wherein a limiting groove is provided in the supporting seat, and the bracket is attached in the limiting groove.

7. The portable uniform-temperature gas oven as claimed in claim 5, wherein a rectangular handle is fixed on the front side of the oven body.

8. The portable uniform-temperature gas oven as claimed in claim 5, wherein an igniter is fixed at the left end of the oven body by an igniting box at the front side of the oven body.

9. The portable uniform-temperature gas oven as claimed in claim 5, wherein the flame dispersion plate is provided with four fixing foots at four corners thereof, and the grilling net is provided with four supporting foots at four corners thereof, and the four supporting foots being inserted into the four fixing foots of the flame dispersion plate, respectively.

* * * * *